W. R. FOX.
DRILL.
APPLICATION FILED OCT. 30, 1915.
1,229,601.
Patented June 12, 1917.
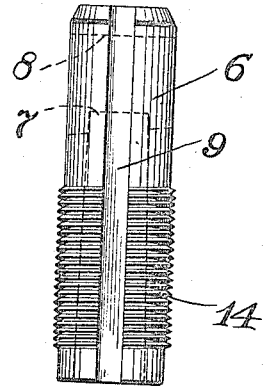
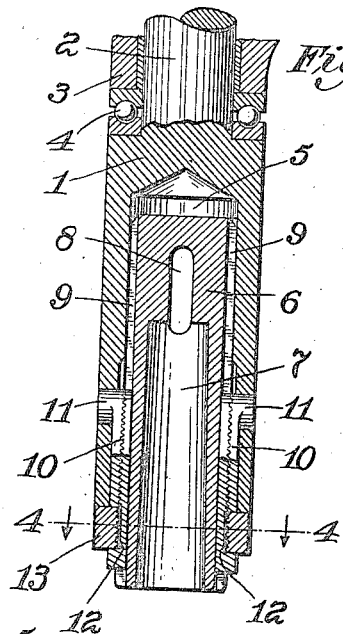
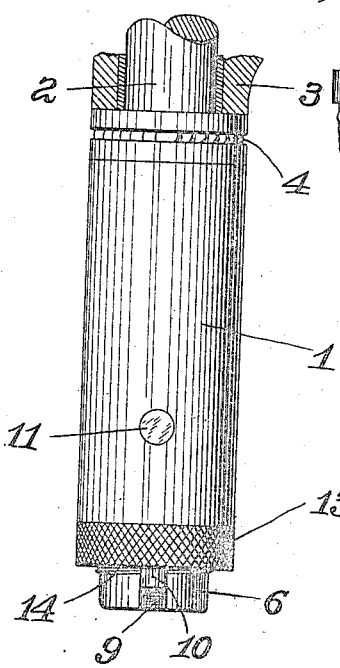
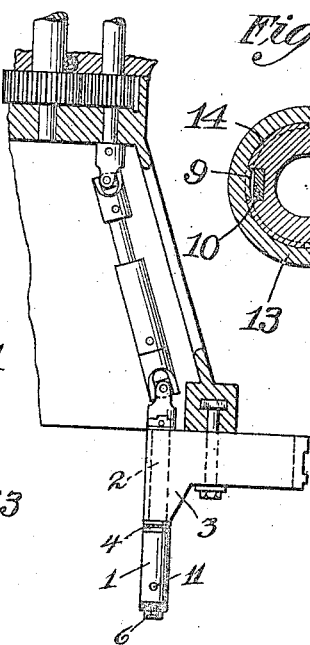
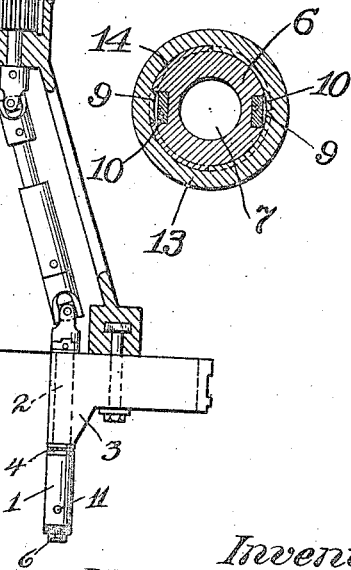
Inventor.
William R. Fox.

UNITED STATES PATENT OFFICE.

WILLIAM R. FOX, OF GRAND RAPIDS, MICHIGAN.

DRILL.

1,229,601.  Specification of Letters Patent.  Patented June 12, 1917.

Original application filed January 23, 1914, Serial No. 813,855. Divided and this application filed October 30, 1915. Serial No. 58,892.

*To all whom it may concern:*

Be it known that I, WILLIAM R. FOX, a citizen of the United States, residing at Grand Rapids, Michigan, have invented certain new and useful Improvements in Drills, of which the following is a specification.

The present invention relates to improvements in drills, and is especially adapted for use in connection with multiple drills, although it is not limited in its application to this particular type of machine.

The principal object of the invention consists in providing improved means for adjusting the drill collet longitudinally of the drill spindle.

The invention is illustrated and described as an improvement adapted to be applied to a multiple drill of the type shown in my prior Patent 1,058,045, and the present application is filed as a division of my copending application Serial No. 813,855.

Further objects of the invention will be made apparent from the following specification, accompanying drawings and appended claims.

In the drawings

Figure 1 is a view in side elevation of the collet removed from the drill;

Fig. 2 is a vertical sectional view showing in detail the adjustable collet;

Fig. 3 is a view in side elevation of the lower spindle with the parts assembled;

Fig. 4 is a transverse section on the line 4—4 of Fig. 2.

Fig. 5 is a fragmental detail showing the driving connections for one of the drill spindles.

Referring to the drawings, the drill spindle 1 is provided at its upper end with a portion 2 of reduced diameter having a bearing in a bracket 3 only a fragmentary part of which is here shown. Ball bearings 4 are provided between the shoulder formed at the lower end of the reduced portion 2 and the bottom of the bracket 3.

The spindle 1 is provided with a socket 5 in which is inserted the collet 6 which is provided with a tapered socket 7 receiving the tapered shank of the drill. An oblong slot 8 is provided through the top of the collet 6 and a drift may be driven through said slot for the purpose of forcing the drill shank from the tapered socket. Grooved keyways 9 are disposed diametrically opposite each other and run longitudinally of the collet. Keys 10 are secured in the lower part of the spindle socket by means of pins 11 carried on the upper end of said keys and secured in openings provided in the walls of the socket. These keys are provided with notches 12 at the lower ends thereof in which the knurled adjusting nut 13 is supported. The upper portion of the collet 6 is plain, while the lower portion thereof is provided with screw-threads 14 engaging the threaded nut 13 for adjusting the collet with reference to the keys 10 and the spindle.

From the description of the parts given above the operation of the structure should be readily understood. The tapered shank of the drill is inserted in the tapered socket 7 of the collet 6. The collet 6 is secured against rotary movement in the spindle socket 5 by means of the keys 10, which are rigidly secured to the socket wall. The knurled nut 13 engages the threaded portion 14 of the lower portion of the collet and serves to adjust it longitudinally of the thimble, the grooved keyways 9 permitting the collet to slide longitudinally. The ball bearings 4 provide an anti-friction bearing between the shoulder on the spindle and on the lower end of the bracket 3.

What I claim is:

1. In a drill, the combination of a spindle, driving connections therefor, a socket in the lower end of said spindle, a drill carrying member slidable longitudinally in said socket, said member being provided with grooved longitudinal keyways, keys secured to the inner wall of said socket and disposed in the grooved keyways of said member, said keys being provided with notches in the lower ends thereof, an adjusting nut carried by said notches, the lower portion of said drill carrying member being provided with screw threads adapted to be engaged by said adjusting nut for adjusting said collet longitudinally of the spindle, all coacting substantially as described for the purpose specified.

2. In a drill, the combination of a spindle, driving connections therefor, a socket in the lower end of said spindle, a drill carrying member slidable longitudinally in said socket, said member being provided with grooved longitudinal keyways, the wall of said socket being provided with a pair of openings, keys provided with pins at their upper ends, said pins being secured in said openings in the wall of said socket, said keys being disposed in the grooved ways of said drill carrying member and provided at the lower end thereof with notches, an adjusting nut carried by said notches, the lower portion of said member being screw threaded so as to be engaged by said adjusting nut for adjusting said member longitudinally of the spindle, all coacting substantially as described for the purpose specified.

3. In a drill, the combination of a spindle, driving connections thereof, a socket in the lower end of said spindle, a drill carrying member slidable longitudinally in said socket, means for preventing the rotation of said member relative to said spindle, an adjusting nut carried by said spindle, said nut being free to rotate on said spindle and fixed against longitudinal movement relative thereto, the lower portion of said drill carrying member being screw threaded so as to be engaged by said adjusting nut for adjusting said member longitudinally of the spindle, all coacting substantially as described for the purpose specified.

4. In a drill, the combination of a spindle, driving connections therefor, said spindle having a socket in its lower end, a drill carrying member slidable longitudinally in said socket, means between said drill carrying member and the wall of the socket for preventing rotation of said drill carrying member relatively to the socket, a rotatable member supported by said means and engaging said drill carrying member, said rotatable member adapted upon rotation to move said drill carrying member longitudinally within the socket and holding the drill carrying member against longitudinal movement in either direction in all of the angular positions that said rotatable member may assume.

5. In a drill, the combination of a spindle, driving connections therefor, said spindle having a socket in its lower end, a drill carrying member slidable longitudinally in said socket, said member having a key and keyway connection with the wall of the socket, and a rotatable member supported by the keys and having threaded engagement with said drill carrying member for moving the latter longitudinally within the spindle socket and holding the drill carrying member against longitudinal movement in either direction in all of the angular positions that said rotatable member may assume, substantially as described.

6. In combination, a spindle having a socket, a drill carrying member adapted to said socket, a key and keyway connection between the said member and the wall of the socket to prevent relative rotation between said drill carrying member and the socket, said drill carrying member being externally screw threaded and a rotatable member held at one fixed point against axial movement relative to the socket and screw threaded to engage the external threads on the drill carrying member, said rotatable member holding the drill carrying member against longitudinal movement in either direction in all the angular positions of said rotatable member, substantially as described.

WILLIAM R. FOX.

Witnesses:
 MYRA JONES,
 FLORENCE GERMAN.